United States Patent [19]

Waggener

[11] 4,166,979
[45] Sep. 4, 1979

[54] SYSTEM AND METHOD FOR EXTRACTING TIMING INFORMATION FROM A MODULATED CARRIER

[75] Inventor: William N. Waggener, Sarasota, Fla.

[73] Assignee: Schlumberger Technology Corporation, New York, N.Y.

[21] Appl. No.: 869,071

[22] Filed: Jan. 12, 1978

Related U.S. Application Data

[63] Continuation-in-part of Ser. No. 684,604, May 10, 1976, abandoned.

[51] Int. Cl.$^2$ ............................................. H04L 15/24
[52] U.S. Cl. ................................. 325/321; 178/69.1; 178/88; 328/133; 367/83
[58] Field of Search .......................... 325/321, 325, 30; 178/69.1, 88; 179/15 BS; 329/122, 104; 328/133, 139; 340/18 LD

[56] References Cited

U.S. PATENT DOCUMENTS

| | | | |
|---|---|---|---|
| 3,411,090 | 11/1968 | Lescinsky | 325/323 |
| 3,557,308 | 1/1971 | Alexander | 178/69.1 |
| 3,603,890 | 9/1971 | Camenzind | 329/122 |
| 3,742,443 | 6/1973 | Foster | 340/18 LD |
| 3,746,994 | 7/1973 | Kramer | 178/88 |
| 3,746,997 | 7/1973 | Willett | 329/122 |
| 3,757,244 | 9/1973 | Giger | 329/122 |
| 3,787,775 | 1/1974 | Lanning | 178/88 |
| 3,865,981 | 2/1975 | Welch | 178/69.1 |
| 3,878,334 | 4/1975 | Halpern | 178/69.1 |
| 3,886,495 | 5/1975 | Sexton | 340/18 LD |
| 3,906,376 | 9/1975 | Bass | 178/88 |
| 3,936,604 | 2/1976 | Pommerening | 178/69.1 |

FOREIGN PATENT DOCUMENTS 2079735 10/1971 France.
2175580 10/1973 France.
2332660 6/1977 France.

Primary Examiner—Benedict V. Safourek
Assistant Examiner—Michael A. Masinick
Attorney, Agent, or Firm—William R. Sherman; Martin M. Novack

[57] ABSTRACT

The disclosure relates to an apparatus for receiving a carrier signal modulated with digital symbols, the symbol rate being related to the carrier frequency, such as by a submultiple or a ratio of integers. The invention is an adaptive carrier-aided symbol tracking loop in which signals derived from a symbol-coherent carrier maintain and aid symbol synchronization during periods of no symbol transitions. The invention is particularly applicable to systems wherein the received modulated carrier signal has been transmitted over a noisy transmission path, such as in a logging-while-drilling system. In accordance with the invention there is provided a phase-locked loop which includes a voltage controlled oscillator and an error signal generator for controlling the oscillator. In response to the carrier, a first signal is generated at substantially the symbol rate and, in response to symbol transitions, a second signal is generated which has a phase that depends upon symbol transitions. The error signal generator includes at least one phase comparator which is responsive to a signal derived from the oscillator and to the first and second signals for generating error signals that are applied to the oscillator. If symbol transitions are present, the second signal is used to maintain loop synchronization. If symbol transitions are absent, loop synchronization is maintained by deriving the error signal from the first signal; i.e., a signal at the symbol rate derived from the carrier.

53 Claims, 6 Drawing Figures

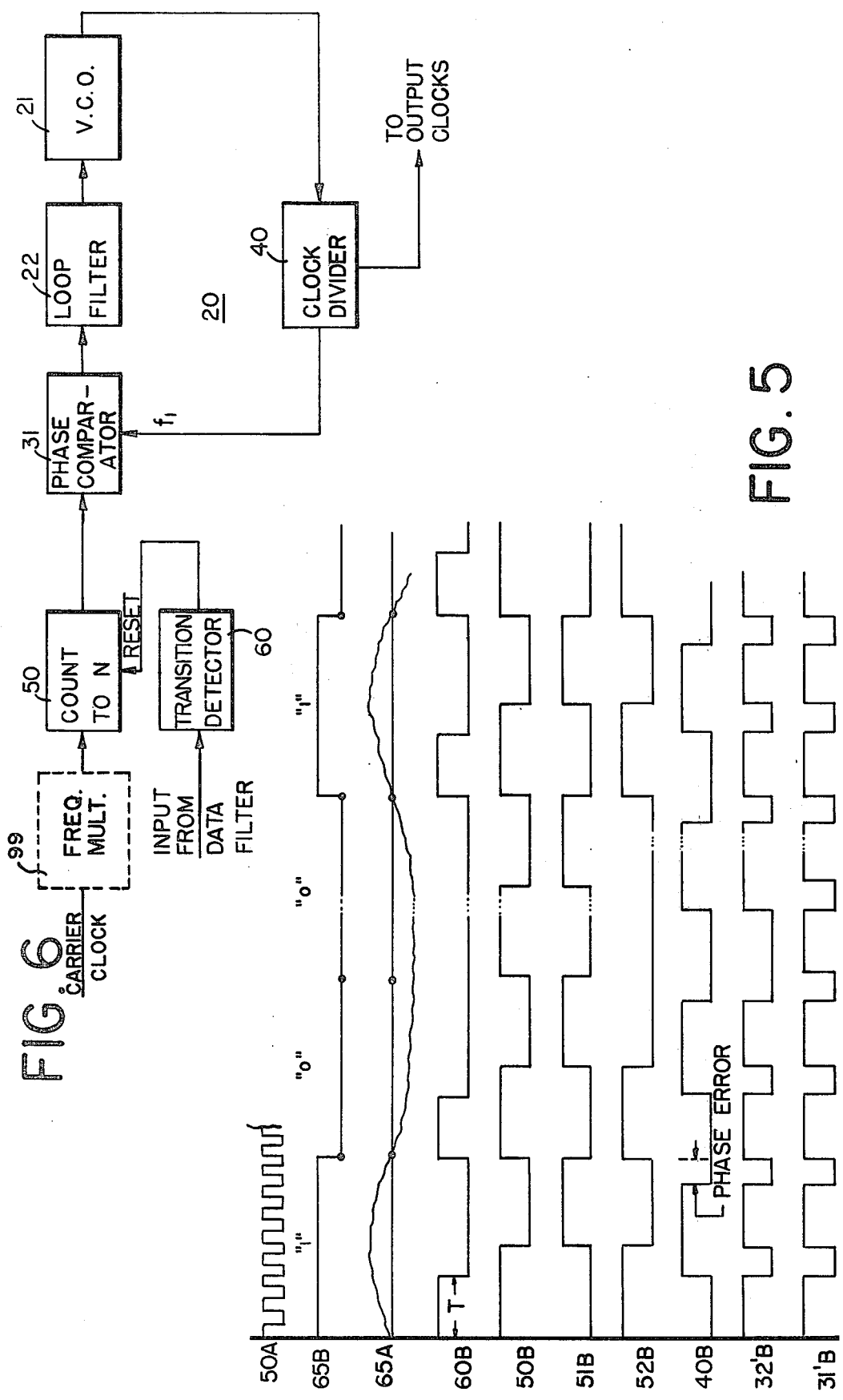

SYSTEM AND METHOD FOR EXTRACTING TIMING INFORMATION FROM A MODULATED CARRIER

BACKGROUND OF THE INVENTION

This is a continuation-in-part of U.S. Application Serial No. 684,604 filed May 10, 1076, now abandoned.

This invention relates to digital signalling systems and, more particularly, to the extraction of timing information from digital signalling systems.

When digital data is transmitted by electrical, acoustic, mechanical or other means, it is necessary at the receiving end to extract timing information from the received signal in order to identify the start time epoch of each transmitted digital symbol. Typically, at the transmitter end a carrier signal was modulated with digital symbols, the symbol rate being related to the carrier frequency, generally either as a multiple thereof or as a ratio of integers. In systems where the received signal has become noisy, the problem of accurately obtaining timing information is particularly acute. For example, one type of system wherein a noisy transmission path is experienced is a so-called "logging-while-drilling" system wherein well logging data is transmitted to the surface of a borehole via a drill pipe during the drilling operation. In such instance, it is difficult to transmit acquired data to the surface electrically unless the drill pipe is provided with a special insulated conductor including means for forming appropriate connections for the conductor at the drill pipe joints. Accordingly, there have been proposed various systems for transmitting the logging data acoustically, either through the drill pipe or in drilling liquid. Typically, the data is converted to digital form and then used to modulate a carrier signal, such as by "phase-shift keying" ("PSK"), "frequency-shift keying" ("FSk"), or "amplitude-shift keying" ("ASK"). At the surface, the acoustic signal is detected and demodulated in order to provide the desired readout information (see e.g. U.S. Pat. No. 3,886,495). In this type of system, or any other wherein the transmission medium is less than ideal, the signal experiences substantial noise and this renders it difficult to extract symbol timing information. Some techniques for extracting symbol timing were described in an article entitled "Recent Advances in Symbol Synchronization" by W. N. Waggener, which appeared in Volume 12, No. 1 of *Instrument Society of America Transactions*, at page 7.

When digital data is transmitted by modulating a carrier and the carrier frequency is coherently related to the symbol rate, timing information from the carrier wave can be used to aid in extracting symbol timing information. By way of a numerical example, if the symbol rate were say, 600 symbols per second, and the modulated carrier frequency was, say 2400 hertz, there are four carrier cycles per symbol period. Simple division of the carrier frequency by a factor of 4 would yield a clock frequency equal to the symbol rate. Although the divided frequency would be substantially correct, the division process produces an ambiguous phase which must be resolved.

Symbol timing information could also be extracted from the digital data independently of the carrier frequency, as is disclosed in the above-referenced publication. Symbol timing information can only be obtained, however, when a symbol changes from one value to another value. Thus, extended periods without such a transition render it difficult to maintain symbol synchronization. Also, where unusually high noise levels are experienced during transmission, such as in a logging-while-drilling system, the problem of maintaining synchronization is intensified.

It is an object of the present invention to provide a system which minimizes errors during detection of timing information.

SUMMARY OF THE INVENTION

The present invention relates to an apparatus for receiving a carrier signal modulated with digital symbols, the symbol rate being related to the carrier frequency, such as by a submultiple or a ratio of integers. The invention is an adaptive carrier-aided symbol tracking loop in which signals derived from a symbol-coherent carrier maintain and aid symbol synchronization during periods of no symbol transitions. In the invention, timing error signals are used to modify the synchronization-aiding signal from a symbol-coherent carrier. Symbol transitions are also utilized to remove phase ambiguity from carrier derived signals. The invention is particularly applicable for use in a logging-while-drilling system wherein the modulated carrier has been transmitted over a very noisy transmission path.

In accordance with the invention there is provided a phase-locked loop which includes an oscillator and an error signal generating means for controlling the oscillator. Means responsive to the carrier are provided for generating a first signal at substantially the symbol rate, and means responsive to symbol transition are provided for generating a second signal which has a phase that depends upon symbol transitions. The error signal generating means is responsive to the first signal, the second signal and a signal derived from he oscillator for generating an error signal to control the oscillator. In an embodiment of the invention the first signal generating means is a counter. The counter counts carrier clock pulses and issues an output at the symbol rate. The counter is reset by the second signal, and preferably issues an output when it is reset. In this manner, the counter output, which is input to the error signal generating means, is determined by symbol transitions, when present, and is otherwise determined from counting carrier clock pulses. The desired timing information can be derived from the oscillator output.

In another embodiment of the invention, a first comparator means is responsive to a signal dervied from the oscillator and to the first signal for generating a first error signal component, the first error signal component having a value which is a function of the difference between the first signal and the signal derived from the oscillator. A second comparator means is responsive to a signal derived from the oscillator and the second signal (derived from the symbol transitions) for generating a second error component signal, the second error component signal having a value which is a function of the difference between the phase derived from the symbol transition rate and the phase derived from the oscillator. The first and second error component signals are applied to the error signal generating means which is responsive to the signals to cause the oscillator to track the received symbol-modulated carrier signal. In this embodiment of the invention, means are provided for weighting the values of the error component signals, the weightings being such that the second error component signal is applied to the error signal generating means with greater weight than the first error component signal. In this manner, the error component signal derived from the symbol transitions (when present) is given greater weight in controlling the oscillator.

Further features and advantages of the invention will become more readily apparent from the following detailed description when taken in conjunction with the accompanying drawings.

BRIEF DESCRIPTION OF THE DRAWINGS

FIG. 5 is a series of timing diagrams which illustrate signal waveforms at various points in the diagram of FIG. 4.

FIG. 6 is a schematic block diagram of a system in accordance with another embodiment of the invention.

DESCRIPTION OF THE PREFERRED EMBODIMENT

Figure 1:
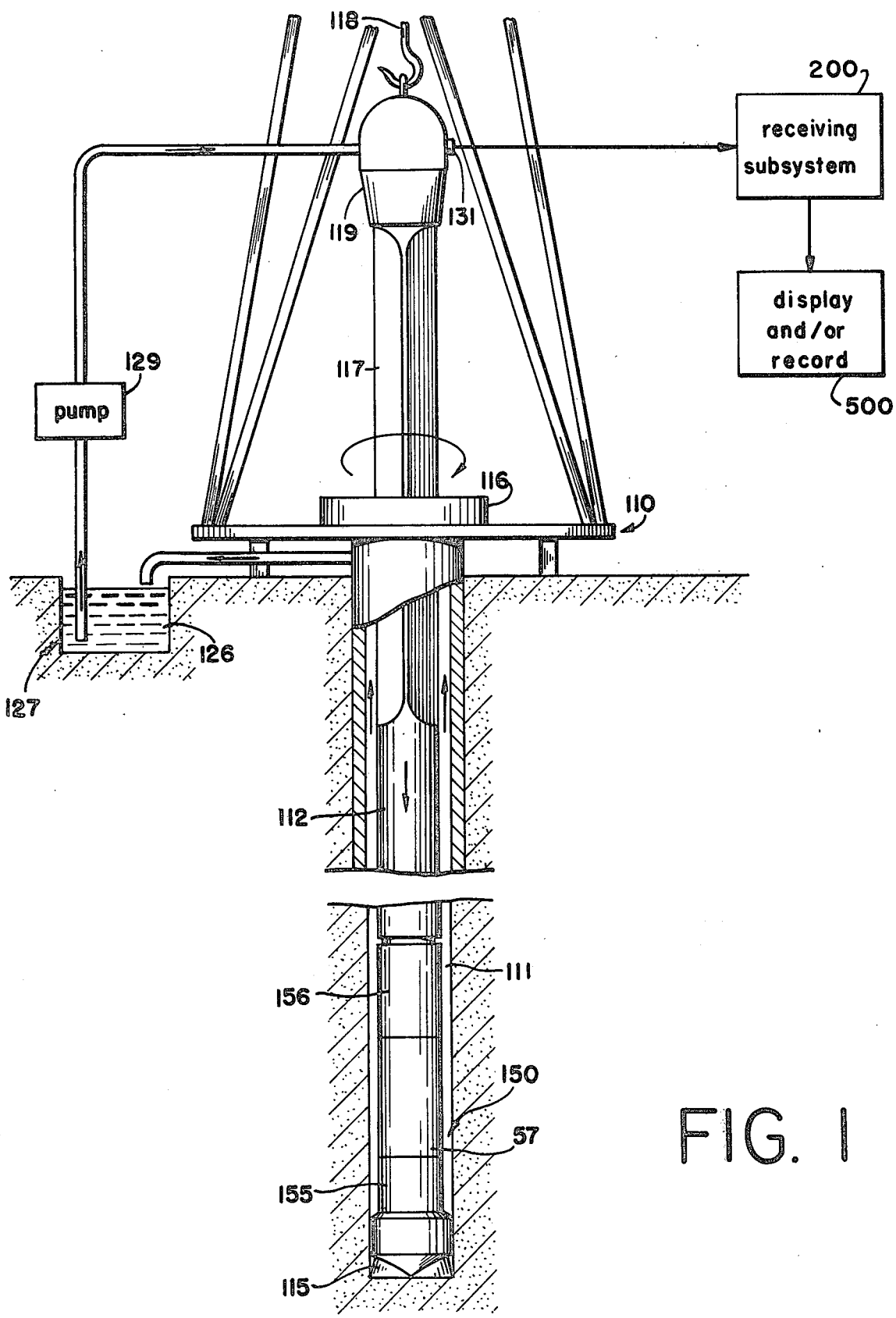
FIG. 1 is a diagram of a drilling apparatus including a logging-while-drilling apparatus which incorporates the present invention.

Referring to FIG. 1, there is illustrated a simplified diagram of a logging-while-drilling apparatus which incorporates the system of the present invention, as used in conjunction with a conventional drilling apparatus. A platform and derrick 110 are positioned over a borehole 111 that is formed in the earth by rotary drilling. A drill string 112 is suspended within the borehole and includes a drill bit 115 at its lower end. The drill string 112, and the drill 115 attached thereto, is rotated by a rotating table 116 (energized by means not shown) which engages a kelly 117 at the upper end of the drill string. The drill string is suspended from a hook 118 attached to a travelling block (not shown). The kelly is connected to the hook through a rotary swivel 119 which permits rotation of the drill string relative to the hook. Drilling fluid or mud 126 is contained in a pit 127 in the earth. A pump 129 pumps the drilling fluid into the drill string via a port in the swivel 119 to flow downward through the center of drill string 112. The drilling fluid exits the drill string via ports in the drill bit 115 and then circulates upward in the region between the outside of the drill string and the periphery of the borehole. As is well known, the drilling fluid thereby carries formation cuttings to the surface of the earth, and the drilling fluid is returned to the pit 127 for recirculation. The small arrows in FIG. 1 illustrate the typical direction of flow of the drilling fluid.

Mounted within the drill string 112, preferably near the drill bit 115, is a downhole sensing and transmitting subsystem 150. Subsystem 150 includes a measuring apparatus 155 which may measure any desired downhole condition, for example resistivity, gamma ray, weight on bit, tool face angle, etc. it will be understood, however, that the measuring apparatus 155 can be employed to measure any useful downhole parameter. The transmitting portion of the downhole subsystem includes an acoustic transmitter 156 which generates an acoustic signal in the drilling fluid that is representative of the measured downhole conditions. One suitable type of acoustic transmitter, which is known in the art, employs a device known as a "mud siren" which includes a slotted stator and a slotted rotor that rotates and repeatedly interrupts the flow of drilling fluid to establish a desired acoustic wave signal in he drilling fluid. Transmitter 156 is controlled by transmitter control and driving electronics 157 which includes analog-to-digital (A/D) circuitry that converts the signals representative of downhole conditions into digital form. The control and driving electronics 157 also includes a phase shift keying (PSK) modulator which produces driving signals for application to the transmitter 156.

In conventional phase shift keyed (PSK) communications, the phase of a carrier signal is changed in accordance with a digital data signal having two or more levels to produce a modulated carrier having two or more phases. The carrier phase is conventionally changed in alternate directions (that is alternating lead and lag) so that the net change in carrier phase over a long period of time is close to zero. In a logging-while-drilling system wherein an electromechanical device, such as a mud siren, is employed to impart acoustic waves to the drilling fluid, it is preferable to effect all phase changes in the same direction (i.e. either all lags or all leads) which results in the technique for driving the mud siren being more efficient and straightforward. The term "undirectional" PSK modulation means this type of modulation wherein all phase changes are in the same direction. Techniques for driving a mud siren to obtain a PSK modulated acoustic carrier wave in drilling fluid, and to obtain unidirectional PSK modulation thereof, are disclosed, for example, in the U.S. Pat. Nos. 3,789,355 and 3,820,063. It will be understood, however, that any suitable technique can be employed for obtaining a modulated carrier for use in conjunction with the invention as described herein.

The generated acoustic wave (i.e., the primary component thereof to be received) travels upward in the fluid through the center of the drill string at the speed of sound in the fluid. The acoustic wave is received at the surface of the earth, by transducers represented by reference numeral 131. The transducers, which may for example be piezoelectric transducers, convert the received acoustic signals to electronic signals. The output of the transducers 131 is coupled to the uphole receiver 200 which is operative to demodulate the transmitted signals and display the downhole measurement information on display and/or recorder 500.

Figure 2:
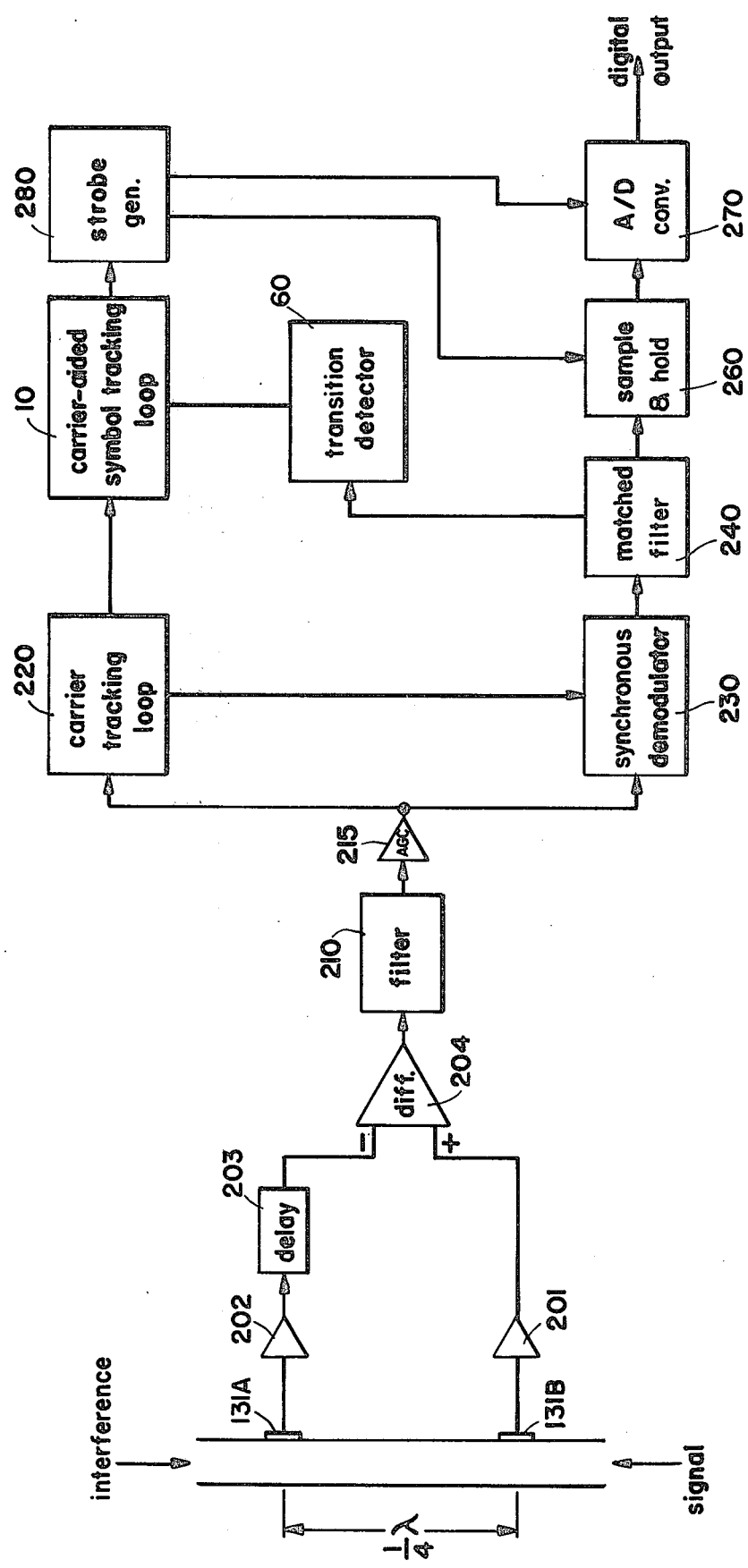
FIG. 2 is a block diagram of the uphole receiver of the FIG. 1 apparatus, the receiver including the carrier aided symbol tracking system of the present invention.

Referring to FIG. 2, there is shown a block diagram of the uphole receiver which includes an improved filter in accordance with the invention. The acoustic signals in the borehole fluid are sensed by transducers 131 (FIG. 1) which comprise transducers 131A and 131B. This pair of transducers is utilized in conjunction with a differential detection arrangement that includes delay 203 and difference amplifier 204. The output of transducer 131B is coupled, via buffer amplifier 202 and delay 203, to the negative input terminal of the difference amplifier 204. The transducer 131A is coupled, via buffer amplifier 201, to the positive input terminal of difference amplifier 204. This differential detector arrangement is employed for the purpose of rejecting noise traveling in a direction of propagation that is opposed to that of the primary acoustic carrier wave. For example, if the distance between transducers 131A and 131B is selected as being a quarter wavelength at the carrier frequency, and the delay 203 is also set at a quarter wavelength at the carrier frequency, acoustic waves traveling in the direction of the primary signal (arrow A) will experience a total of one-half wavelength of phase retardation. When the output of delay 203 is subtracted from the undelayed signal from transducer 131A, signals traveling in the direction of arrow A are seen to add in phase. However, acoustic signals traveling in the opposite direction (arrow B) will result in inputs to the differential amplifier 204 that are in phase, thereby resulting in the cancellation of these signals. This is readily seen by recognizing that, in such case, the input to the positive input terminal of differential amplifier 204 experiences a quarter wavelength delay due to the transducer spacing, whereas the input to the negative input terminal of the differential amplifier 204 experiences a quarter wavelength delay due to the electrical delay 203.

The output of differential amplifier 204 is coupled to a bandpass filter 210 whose output is coupled to an automatic gain control (AGC) amplifier 215 which is provided with a fast-attack slow-release characteristic. The fast-attack mode is useful in achieving stability and sync lock in a minimum time, and the slow release mode maintains the gain during momentary loss or level change of signal. The output of AGC amplifier 215 is coupled to both a synchronous demodulator 230 and a carrier tracking loop 220.

The carrier tracking loop circuit 220 includes a phase-locked loop, and the output of circuit 220 is derived from the output of a voltage controlled oscillator (VCO) in the phase-locked loop of the circuit. This oscillator typically operates at a multiple of the nominal carrier frequency. A clock generator, which includes a frequency divider, therefore derives a clock signal from this VCO output, the derived clock signal being at the carrier frequency and in a form suitable for use in demodulating the filtered input signal The output of the carrier tracking loop circuit 220 is coupled to the synchronous demodulator 230 which, as noted above, receives as its other input the output of AGC amplifier 215 which is to be demodulated. The synchronous demodulator may be, for example, an analog multiplier. The output of the synchronous demodulator 230 is coupled to a matched filter 240. The filter 240 is matched to a square pulse at the bit rate. As is known in the art, the matched filter is operative, upon a data transition at its input, to integrate for a time equal to one bit period. Accordingly, at a particular time during each bit period, the output of the matched filter is at an extreme positive or negative value at which sampling can be most efficiently achieved. Sampling of the output of matched filter 240 is performed by a sample and hold circuit 260 whose output is coupled to an analog-to-digital converter 270 that generates output information in digital form. The output of matched filter 240 is also coupled, via a limiter (not shown in FIG. 2), to bit transition detector 60 which is described further hereinbelow and produces output pulses synchronized with the bit or symbol transitions. The signal utilized to trigger sampling by the sample and hold circuit 260 and to define the conversion period of the analog-to-digital converter 270 is generated by a strobe generator 280. The sampling signal produced by the strobe generator should be a relatively accurate signal at the bit or symbol rate. To obtain this relatively accurate signal at the bit rate, a carrier-aided symbol tracking loop 10, in accordance with the present invention, is employed.

Figure 3:
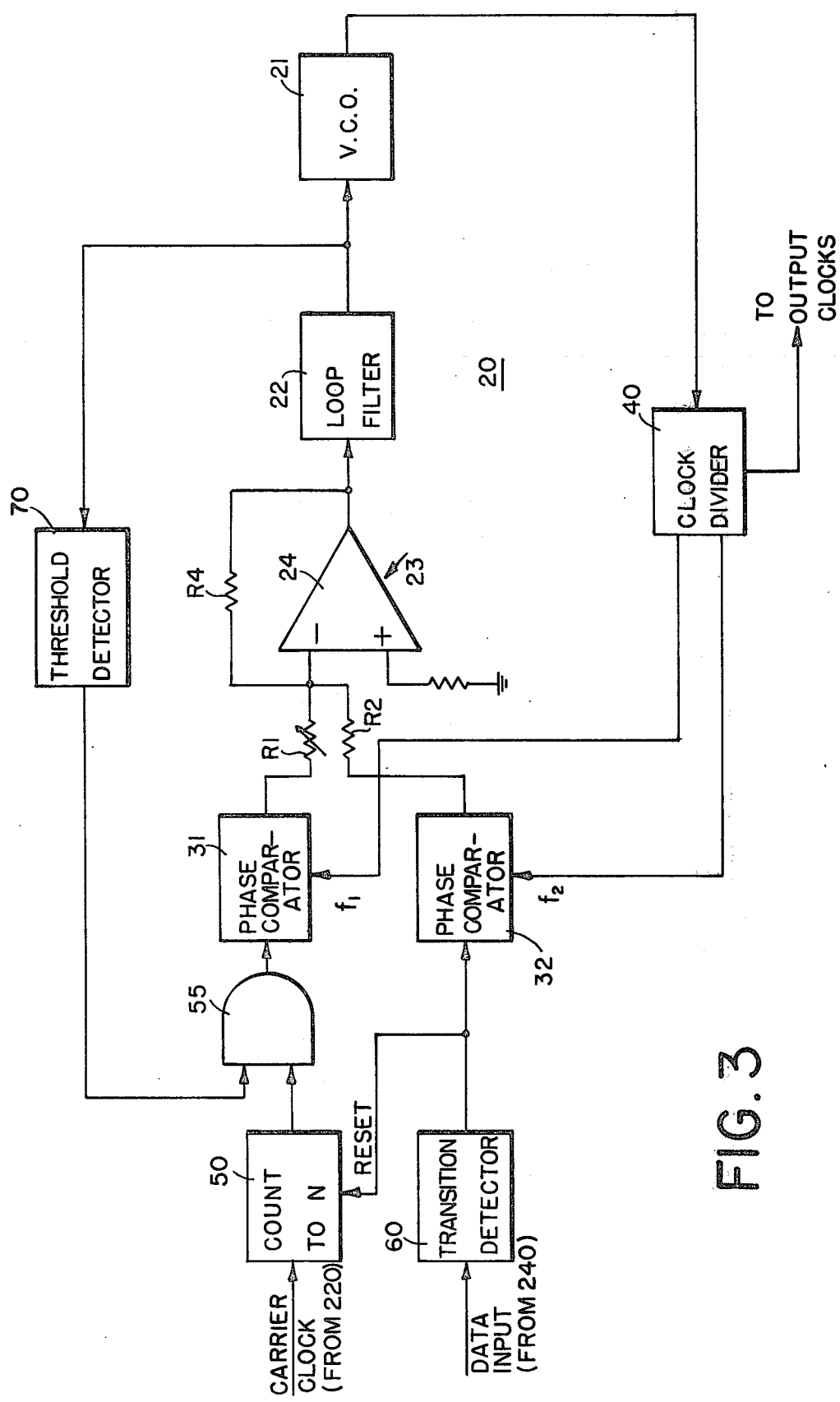
FIG. 3 is a schematic block diagram of a system in accordance with an embodiment of the invention.

Referring to FIG. 3, there is shown a schematic block diagram of a system in accordance with one embodiment of the carrier aided symbol tracking loop 10 in accordance with the invention. The basic timing is provided by a phase-locked loop 20 which includes, inter alia, a voltage controlled oscillator 21, a loop filter 22, and an error signal generating means 23. In the present embodiment, the error signal generating means is a summing amplifier comprising an operational amplifier 24 arranged in conventional manner to serve as a summing amplifier; i.e., with appropriate feedback resistance and a summing junction at its inverting input. The inputs to the summing junction of summing amplifier 23, via weighting resistors R1 and R2, are the outputs of phase comparators 31 and 32 respectively.

Phase comparator 31 receives as one of its inputs a signal having a characteristic frequency $f_1$ which is derived from the oscillator 21 by a digital clock divider 40. The other input to comparator 31 is derived from the carrier of the received signal. For example, in the receiver 200 of FIG. 2, a carrier clock is obtained from the carrier tracking loop 220. The carrier clock is input to a counter 50 whose characteristic count cycle is set at the ratio between the carrier frequency and the symbol rate, this ratio assumed to be an integer N for ease of illustration. The output of the counter 50, which is accordingly at substantially the symbol rate, is coupled to the phase comparator 31 via AND gate 55.

One input to the phase comparator 32 is a signal at a reference frequency $f_2$, which is also derived from oscillator 21 by clock divider 40 and will generally be the same as $f_1$. The other input to phase comparator 32 is the output of transition detector 60 (FIG. 2) whose output is a measure of the detected symbol transitions of the symbol-modulated carrier input signal.

The output of error signal generating means 23 is coupled to loop filter 22. The loop filter output, which is indicative of the error level, is coupled to a threshold detector 70 whose output is a logical "0" if a prescribed threshold level is exceeded. Conversely, the threshold detector output is a logical "1" if the threshold level is not exceeded. The output of threshold detector 70 is the second input to the AND gate 55.

Operation of the system of FIG. 1 is as follows: The output of the transition detector is phase compared to the frequency $f_2$ which is derived from the phase-locked loop oscillator 21. The resultant signal (referred to herein generally as the "second error component signal") is weighted by R2 and applied as an error signal which drives the phase-locked loop to the frequency and phase of the symbol transitions. The output of the transition detector 60 also resets the counter 50. Once the loop 20 is in phase-lock, the error signal in the loop, as measured at the output of the loop filter 22, will be small enough that the output of the threshold detector 70 will become a logical "1" which, in turn, enables the AND gate 55. Now, clock pulses from the counter 50 are fed to phase comparator 31 to be phase compared with the signal at frequency $f_1$. The phase error indicated at the output of comparator 31 (referred to herein generally as the "first error component signal") is weighted by R1 and summed by summing amplifier 23 with the measured phase error based on symbol transitions. A feature of the invention is that if there are no symbol transitions for a period of time, the carrier clock counter 50 maintains loop synchronization. In the present embodiment, when symbol transitions occur, the phase error contribution based on symbol transitions is more heavily weighted than the phase error contribution based on the carrier block by virtue of the different value resistors R1 and R2, so the loop tends to readjust the loop oscillator phase to match the actual symbol transition timing. The resistor R1 is variable to facilitate adjustment of the weighting ratio, when desired. If the loop loses lock, the increase in loop error signal will cause the error contribution due to the carrier clock 50 to be inhibited by virtue of AND gate 55 being disabled. This inhibiting action continues until the occurrence of symbol transitions which relock the phase-locked loop. The necessary system timing is obtained, for example, from clock divider 40.

The voltage controlled oscillator 21 is preferably set to run at a frequency which is a multiple of the symbol rate so that the digital clock divider 40 can provide multiple phases of the reference frequency. This permits the optimum clock phase to be selected for the two phase comparators and permits compensation for any known fixed phase shift between the carrier transitions and the symbol transitions (by using $f_1$ and $f_2$ having an appropriate phase relationship). Preferably, the carrier frequency should be a relatively large multiple of the symbol rate so as to minimize the phase offset due to the resolution of the counter 50. In cases when the carrier frequency is only a small multiple of the symbol rate, a coherent frequency multiplier may be employed to increase the carrier reference clock frequency.

Figure 4:
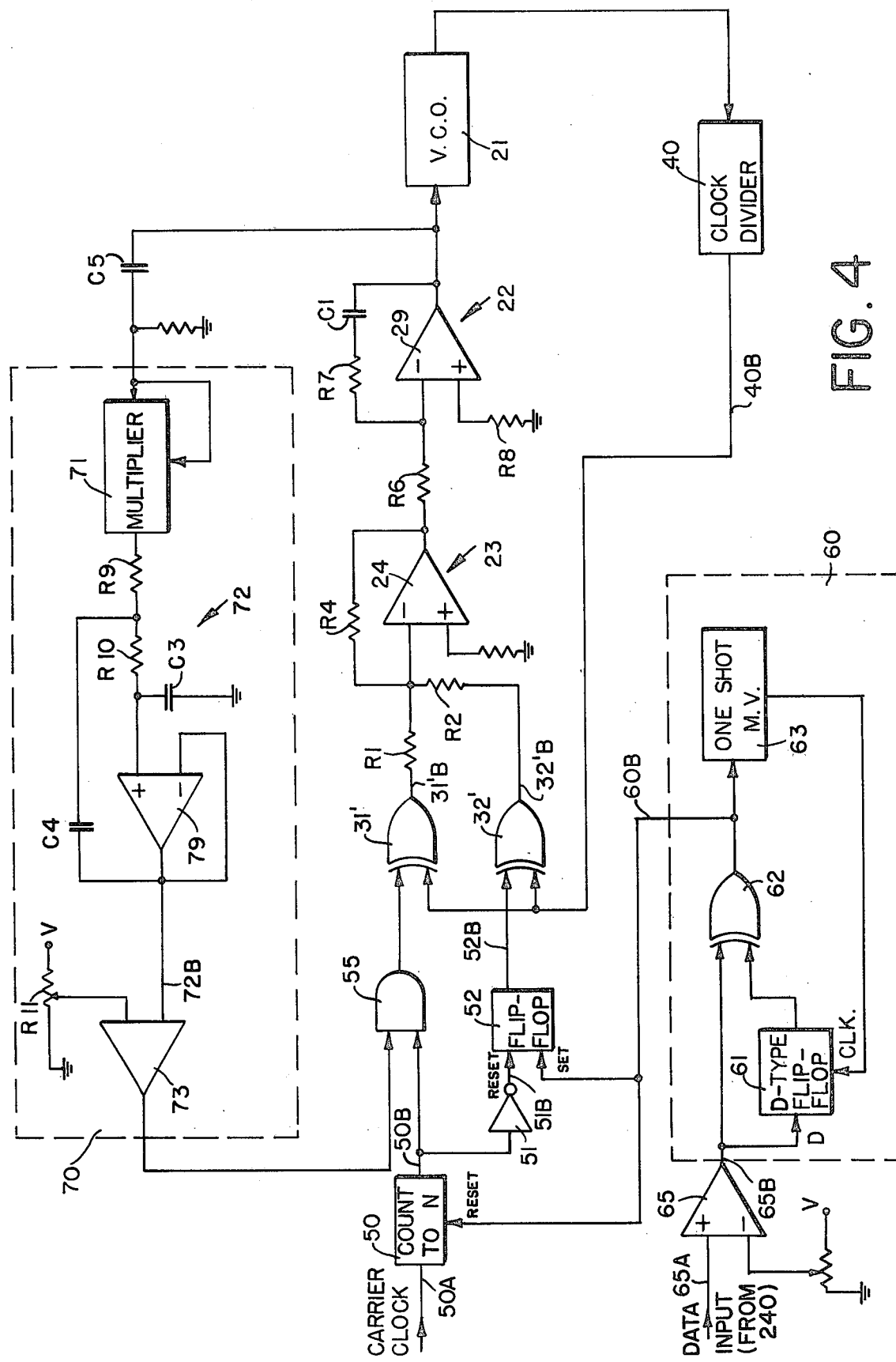
FIG. 4 is a schematic diagram, partially in block form, which illustrates an implementation of the embodiment of FIG. 3.

FIG. 4 is a schematic diagram, partially in block form, which illustrates further details of a particular implementation of the system of FIG. 3. FIG. 5 is a series of timing diagrams which illustrate signal waveforms at various points in the diagram of FIG. 4. For purposes of illustration, the carrier clock is considered as having a frequency of eight times the symbol rate. Also, binary symbols are shown although it will be understood that the invention applied to symbols having more than two levels. The filtered data signal from matched filter 240 (FIG. 2—line 65A in FIG. 4) is limited by a limiter 65 to obtain the data signal on line 65B. The limiter level is determined by adjustable resistor R3. The output of the limiter 65 is coupled to the transition detector 60 (shown in dashed line) which comprises a D-type flip flop 61, an exclusive-OR gate 62 and a monostable multivibrator 63. Specifically, output line 65B is coupled to the input of the D-type flip flop 61 and to one input of exclusive-OR gate 62. The output of gate 62 (line 60B) is coupled to the input of monostable multivibrator 63 whose output is, in turn, coupled to the clock input of the D-type flip flop 61. If the output of the D-type flip flop 61 is initially low, the first positive data transition causes the output of exclusive-OR gate 62 to go high triggering the monostable multivibrator 63. On the trailing edge of the monostable pulse the D-type flip flop is clocked. Since the D-input is at a high level, the flip flop output goes high which causes the exclusive OR gate 62 output to go low. Each time a symbol transition occurs, this process is repeated creating a transition pulse with a width, T, as determined by the monostable duration. The resultant output on line 60B is shown in FIG. 5. The pulse width is selected to be less than one half of the symbol period.

The transition pulse on line 60B resets the counter 50 and is also coupled to the "set" input of a flip flop 52. The input to counter 50 (which in this case performs a full count cycle for each eight carrier clock cycles) is the carrier clock signal 50A, and the output thereof is a signal on line 50B which is coupled to an inverter 51 and to one input of AND gate 55. The signal on line 50B is symmetrical with a frequency equal to the symbol rate, and this signal is inverted and fed to the "reset" input of the flip flop 52. Thus, the output of the flip flop 52, on line 52B, is a symmetrical waveform whose positive-going transitions are determined by the symbol transitions. In the embodiment of FIG. 4, exclusive-OR gates 31' and 32' serve as the first and second comparators. The output of clock divider 40 (e.g. $f_1$ or $f_2$ of FIG. 1) on line 40B is coupled to one input of each of the exclusive-OR gates 31' and 32'. The other input to exclusive-OR gate 31' is the output of AND gate 55. If a small phase error exists in the loop, as depicted in the signal on line 40B (FIG. 5), the phase comparator outputs would be as shown in FIG. 5 for the lines 31'B and 32'B. The output at line 31'B assumes the AND gate 55 to be enabled. The summing amplifier 23 sums the outputs of comparators 31' and 32' to produce an output $$E_{23} = -\frac{R4}{R1} E_{31'} - \frac{R4}{R2} E_{32'}$$

In order to more heavily weight the error signal resulting from symbol transition detection, R1 is made greater than R2. The loop filter 22, which comprises operational amplifier 29, capacitor C1, and resistors R6, R7 and R8, as shown, averages the phase comparator outputs to produce a control signal for voltage controlled oscillator 21. The loop filter output is AC coupled (via C5) to the threshold detector 70 so as to remove DC offset. In the embodiment of FIG. 4, the threshold detector includes an analog multiplier 71, a low pass filter 72, and a level detector 73. The multiplier 71 has the output of the loop filter coupled to both its inputs, so it acts as a squarer. The low pass filter, which comprises operational amplifier 79, resistors R9 and R10, and capacitors C3 and C4, configured as shown, served to average the squared loop filter output so that the signal on line 72B is proportional to the mean square loop phase error. If this error is greater than the threshold level set by variable resistor R11 of detector 73, the threshold detector output on line 70B is low, thereby inhibiting the AND gate 55 so that the phase comparator 31' is inoperative. Conversely, if the mean square loop phase error is less than the prescribed threshold, the signal on line 70B will be "high", thereby enabling the AND gate 55.

A less complex version of the system of FIG. 3 is shown in FIG. 6. In this embodiment, the symbol transition detector 60 resets the counter 50 each time a symbol transition occurs. A single phase comparator 31 is employed and derives an error signal by comparison of the output of the clock divider 40 with the output of counter 50. When symbol transitions are absent, the counter "free runs" and maintains loop lock.

It can be seen that in FIG. 6 an output of counter 50 will occur upon occurrence of a symbol transition (which also resets the counter). In the absence of symbol transitions, N carrier clock pulses (corresponding to the symbol rate) will cause an output of counter 50, thereby maintaining lock. If counter 50 is of the so-called "synchronous" type, an output will occur in synchronism with the carrier clock, and not necessarily exactly at the time of a resetting data signal. In other words, when a reset signal occurs, an output of the counter will occur at the next clock pulse. Since the carrier frequency is typically much higher than the symbol or data frequency, the described counter resolution error will be relatively small. It is preferable, however, to employ an asynchronous counter, which eliminates this error by producing a counter output immediately upon occurrence of a symbol transition. Also, if desired, and as noted above, a frequency multiplier 99 (shown in dashed line) can be utilized to increase the ratio of frequencies, in which case the characteristic count of counter 50 would be increased accordingly.

The invention has been described with reference to particular preferred embodiments, but variations within the spirit and scope of the invention will occur to those skilled in the art. For example, the invention is described in the context of a particular receiving system, as illustrated in FIG. 2, but it will be understood that the invention can be employed in other types of receiving systems.

I claim:

1. A system for extracting timing information from a received carrier signal modulated with digital symbols, the symbol rate being related to the carrier frequency, comprising:
    a phase-locked loop including an oscillator and error signal generating means for controlling said oscillator;
    means responsive to said carrier for generating a first signal at substantially the symbol rate; and
    means responsive to symbol transitions for generating a second signal;
    said error signal generating means being responsive to said first signal, said second signal and a signal derived from said oscillator for generating an error signal to control said oscillator.

2. The system as defined by claim 1 wherein said digital symbol rate is an integral submultiple of the carrier frequency and wherein said signal derived from said oscillator is an integral submultiple of the frequency of said oscillator.

3. The system as defined by claim 1 wherein said first signal generating means comprises a counter.

4. The system as defined in claim 3 wherein said counter is reset by said second signal and said error signal generating means is responsive to the output of said counter and to the signal derived from said oscillator.

5. The system as defined by claim 3 wherein said digital symbol rate is an integral submultiple of the carrier frequency and wherein said signal derived from said oscillator is an integral submultiple of the frequency of said oscillator.

6. The system as defined by claim 3 wherein said counter is an asynchronous counter.

7. The system as defined by claim 6 wherein said counter is reset by said second signal and said error signal generating means is responsive to the output of said counter and to the signal derived from said oscillator.

8. The system as defined by claim 7 wherein said digital symbol rate is an integral submultiple of the carrier frequency and wherein said signal derived from said oscillator is an integral submultiple of the frequency of said oscillator.

9. The system as defined by claim 6 wherein said counter is reset by said second signal and said error signal generating means is reponsive to the output of said counter and to the signal derived from said oscillator.

10. In an apparatus for receiving a carrier signal modulated with digital symbols, the symbol rate being related to the carrier frequency, a system for extracting timing information, comprising:
    a phase-locked loop including an oscillator and error signal generating means for controlling said oscillator;
    means responsive to said carrier for generating a first signal at substantially the symbol rate; and
    means responsive to symbol transitions for generating a second signal;
    said first signal generating means being synchronized by said second signal;
    said error signal generating means being responsive to a signal derived from said oscillator and said first signal for generating an error signal to control said oscillator.

11. The system as defined by claim 10 wherein said digital symbol rate is an integral submultiple of the carrier frequency and wherein said signal derived from said oscillator is an integral submultiple of the frequency of said oscillator.

12. The system as defined by claim 10 wherein said first signal generating means comprises a counter.

13. The system as defined by claim 12 wherein said counter is reset by said second signal.

14. The system as defined by claim 12 wherein said counter is an asynchronous counter.

15. The system as defined by claim 14 wherein said counter is reset by said second signal.

16. The system as defined by claim 15 wherein said digital symbol rate is an integral submultiple of the carrier frequency and wherein said signal derived from said oscillator is an integral submultiple of the frequency of said oscillator.

17. For use in conjunction with an apparatus which receives a carrier signal modulated with digital symbols, the symbol rate being related to the carrier frequency, said system including a phase-locked loop which has an oscillator that responds to an error signal; a method for extracting timing information comprising the steps of:
    generating a first signal in response to said carrier signal at substantially the symbol rate;
    generating a second signal responsive to symbol transitions; and
    combining said first signal, said second signal and a signal derived from said oscillator to generate said error signal.

18. The method as defined by claim 17 wherein the digital symbol rate is an integral submultiple of the carrier frequency.

19. The method as defined by claim 18 wherein the signal derived from the oscillator is an integral submultiple of the oscillator frequency.

20. The method as defined by claim 17 wherein the combining step comprises synchronizing the first signal with the second signal and comparing the phase of the first signal with the signal derived from the oscillator.

21. The method as defined by claim 20 wherein the digital symbol rate is an integral submultiple of the carrier frequency.

22. The method as defined by claim 21 wherein the signal derived from the oscillator is an integral submultiple of the oscillator frequency.

23. In an apparatus for receiving a carrier signal modulated with digital symbols, the symbol rate being related to the carrier frequency, a system for extracting timing information, comprising:

a phase-locked loop including an oscillator and error signal generating means for controlling said oscillator;

means responsive to said carrier for generating a first signal at substantially the symbol rate;

means responsive to symbol transitions for generating a second signal;

first comparator means responsive to a signal derived from said oscillator and said first signal for generating a first error signal component; and second comparator means responsive to a signal derived from said oscillator and said second signal for generating a second error component signal;

said error signal generating means being responsive to said first and second error component signals so as to cause said oscillator to track said received symbol-modulated carrier signal.

24. The system as defined by claim 23 further comprising means for disabling said first error component signal in response to a predetermined condition.

25. The system as defined by claim 23 further comprising means for detecting the output level of said error signal generating means and for disabling said first error component signal when said output level exceeds a prescribed level.

26. The system as defined by claim 23 wherein said digital symbol rate is an integral submultiple of the carrier frequency and wherein said signal derived from said oscillator is an integral submultiple of the frequency of said oscillator.

27. The system as defined by claim 23 further comprising means for synchronizing said first signal generating means with said second signal.

28. The system as defined by claim 23 wherein said first comparator means is responsive to one signal derived from said oscillator and said second comparator means is responsive to another signal derived from said oscillator, and said one and another signals are derived at different phases to compensate for known phase shift between the carrier and the symbol transitions.

29. The system as defined by claim 23 further comprising means for weighting the values of said error component signals.

30. The system as defined by claim 29 wherein said error component signals are weighted such that said second error component signal is applied to said error signal generating means with greater weight than said first error component signal.

31. The system as defined by claim 30 further comprising means for disabling said first error component signal in response to a predetermined condition.

32. The system as defined by claim 30 further comprising means for detecting the output level of said error signal generating means and for disabling said first error component signal when said output level exceeds a prescribed level.

33. The system as defined by claim 30 wherein said digital symbol rate is an integral submultiple of the carrier frequency and wherein said signal derived from said oscillator is an integral submultiple of the frequency of said oscillator.

34. The system as defined by claim 30 further comprising means for synchronizing said first signal generating means with said second signal.

35. The system as defined by claim 30 wherein said first comparator means is responsive to one signal derived from said oscillator and said second comparator means is responsive to another signal derived from said oscillator, and said one and another signals are derived at different phases to compensate for known phase shift between the carrier and the symbol transitions.

36. In a logging-while-drilling apparatus for obtaining subsurface measurements during drilling in a fluid-filled borehole and for communicating the measurements to the surface of the earth, the apparatus comprising: a downhole sensing and transmitting subsystem including means mountable on a drill string for obtaining measurement information, means for generating acoustic carrier waves at a nominal frequency in the borehole fluid, means for PSK modulating the generated acoustic carrier waves in accordance with digital symbols representative of said measurements, the symbol rate being related to the carrier frequency; and an uphole receiver including transducer means for converting the modulated acoustic carrier waves to electronic signals and means for extracting the digital symbols from the electronic signals; an improved system in said uphole receiver for extracting timing information from said electronic signals comprising:

a phase-locked loop including an oscillator and error signal generating means for controlling said oscillator;

means responsive to said carrier for generating a first signal at substantially the symbol rate; and means responsive to symbol transitions for generating a second signal;

said error signal generating means being responsive to said first signal, said second signal and a signal derived from said oscillator for generating an error signal to control said oscillator.

37. The system as defined by claim 36 wherein said digital symbol rate is an integral submultiple of the carrier frequency and wherein said signal derived from said oscillator is an integral submultiple of the frequency of said oscillator.

38. The system as defined by claim 36 wherein said first signal generating means comprises a counter.

39. The system as defined by claim 38 wherein said counter is an asynchronous counter.

40. The system as defined by claim 38 wherein said counter is reset by said second signal and said error signal generating means is responsive to the output of said counter and to the signal derived from said oscillator.

41. The system as defined by claim 40 wherein said digital symbol rate is an integral submultiple of the carrier frequency and wherein said signal derived from said oscillator is an integral submultiple of the frequency of said oscillator.

42. The system as defined by claim 41 further comprising means for disabling said first error component signal in response to a predetermined condition.

43. In a logging-while-drilling apparatus for obtaining subsurface measurements during drilling in a fluid-filled borehole and for communicating the measurements to the surface of the earth, the apparatus comprising: a downhole sensing and transmitting subsystem including means mountable on a drill string for obtaining measurement information, means for generating acoustic carrier waves at a nominal frequency in the borehole fluid, means for PSK modulating the generated acoustic carrier waves in accordance with digital symbols representative of said measurements, the symbol rate being related to the carrier frequency and an uphole receiver including transducer means for converting the modulated acoustic carrier waves to electronic signals and means for extracting the digital symbols from the electronic signals; an improved system in said uphole receiver for extracting timing information from said electronic signals comprising:

a phase-locked loop including an oscillator and error signal generating means for controlling said oscillator;

means responsive to said carrier for generating a first signal at substantially the symbol rate;

means responsive to symbol transitions for generating a second signal;

first comparator means responsive to a signal derived from said oscillator and said first signal for generating a first error signal component; and second comparator means responsive to a signal derived from said oscillator and said second signal for generating a second error component signal;

said error signal generating means being responsive to said first and second error component signals so as to cause said oscillator to track said received symbol-modulated carrier signal.

44. The system as defined by claim 43 further comprising means for disabling said first error component signal in response to a predetermined condition.

45. The system as defined by claim 43 further comprising means for detecting the output level of said error signal generating means and for disabling said first error component signal when said output level exceeds a prescribed level.

46. The system as defined by claim 43 wherein said digital symbol rate is an integral submultiple of the carrier frequency and wherein said signal derived from said oscillator is an integral submultiple of the frequency of said oscillator.

47. The system as defined by claim 43 further comprising means for synchronizing said first signal generating means with said second signal.

48. The system as defined by claim 43 wherein said first comparator means is responsive to one signal derived from said oscillator and said second comparator means is responsive to another signal derived from said oscillator, and said one and another signals are derived at different phases to compensate for known phase shift between the carrier and the symbol transitions.

49. The system as defined by claim 43 further comprising means for weighting the values of said error component signals.

50. The system as defined by claim 49 wherein said error component signals are weighted such that said second error component signal is applied to said error signal generating means with greater weight than said first error component signal.

51. The system as defined by claim 50 wherein said digital symbol rate is an integral submultiple of the carrier frequency and wherein said signal derived from said oscillator is an integral submultiple of the frequency of said oscillator.

52. The system as defined by claim 50 further comprising means for synchronizing said first signal generating means with said second signal.

53. The system as defined by claim 50 wherein said first comparator means is responsive to one signal derived from said oscillator and said second comparator means is responsive to another signal derived from said oscillator, and said one and another signals are derived at different phases to compensate for known phase shift between the carrier and the symbol transitions.

* * * * *

UNITED STATES PATENT AND TRADEMARK OFFICE
CERTIFICATE OF CORRECTION

PATENT NO. : 4,166,979
DATED : September 4, 1979
INVENTOR(S) : William N. Waggener It is certified that error appears in the above-identified patent and that said Letters Patent are hereby corrected as shown below:

Column 1, line 37, "("FSk")" should read -- ("FSK") --.

Column 2, line 35, "he" should read -- the --.

Column 2, line 48, "dervied" should read -- derived --.

Column 4, line 5, "he" should read -- the --.

Column 4, line 57, "131B" should read -- 131A --.

Column 4, line 59, "131A" should read -- 131B --.

Column 5, line 5, "131A" should read -- 131B --.

Column 6, line 25, insert -- is -- between "ratio" and "assumed".

Column 6, line 44, "FIG. 1" should read -- FIG. 3 --.

Column 7, line 37, insert -- can be -- between "invention" and "applied".

Column 8, line 38, "served" should read -- serves --.

UNITED STATES PATENT AND TRADEMARK OFFICE
CERTIFICATE OF CORRECTION

PATENT NO. : 4,166,979

DATED : September 4, 1979

INVENTOR(S) : William N. Waggener

It is certified that error appears in the above-identified patent and that said Letters Patent are hereby corrected as shown below:

In the Drawing Figures:

Fig. 1, item "57" should be labelled -- 157 --.

Fig. 4, the resistor connected to the inverting input of limiter 65 should be labelled -- R3 --.

Fig. 4, the line from level detector 73 to AND gate 55 should be labelled -- 70B --.

Signed and Sealed this

Twenty-sixth Day of October 1982

[SEAL]

Attest:

Attesting Officer

GERALD J. MOSSINGHOFF

Commissioner of Patents and Trademarks